US011048668B2

(12) United States Patent
Boutnaru (10) Patent No.: US 11,048,668 B2
(45) Date of Patent: Jun. 29, 2021

(54) SENSITIVE DATA MANAGEMENT (71) Applicant: PAYPAL, INC., San Jose, CA (US)

(72) Inventor: Shlomi Boutnaru, Modlin (IL)

(73) Assignee: PAYPAL, INC., San Jose, CA (US)

( * ) Notice: Subject to any disclaimer, the term of this patent is extended or adjusted under 35 U.S.C. 154(b) by 737 days.

(21) Appl. No.: 15/261,693

(22) Filed: Sep. 9, 2016

(65) Prior Publication Data

US 2018/0075058 A1    Mar. 15, 2018

(51) Int. Cl.
| | | |
|---|---|---|
| *G06F 16/00* | (2019.01) | |
| *G06F 16/178* | (2019.01) | |
| *H04L 29/06* | (2006.01) | |
| *G06F 16/13* | (2019.01) | |

(52) U.S. Cl.
CPC ........ *G06F 16/1787* (2019.01); *G06F 16/137* (2019.01); *H04L 63/04* (2013.01)

(58) Field of Classification Search
CPC ........................... G06F 16/137; G06F 16/1787
See application file for complete search history.

(56) References Cited

U.S. PATENT DOCUMENTS

| | | | | |
|---|---|---|---|---|
| 8,676,759 | B1* | 3/2014 | Zhu | G06F 11/1451 707/638 |
| 2015/0142765 | A1* | 5/2015 | Hong | G06F 16/178 707/698 |
| 2016/0085769 | A1* | 3/2016 | Penangwala | G06F 16/137 707/610 |
| 2017/0177867 | A1* | 6/2017 | Crofton | G06F 21/565 |

* cited by examiner

*Primary Examiner* — Dinku W Gebresenbet
(74) *Attorney, Agent, or Firm* — Haynes and Boone, LLP (57) ABSTRACT

A system for discovering and monitoring data movement across the file system on a specific device or across the network, which enables to detect data leakage and locate specific data across the organization. The system tracks files by having devices maintain a record of hash values associated with a file in a tables of hash values. The memory used to maintain the records of each file can be distributed to each device carrying the files. The system can analyze the data leak of a file by receiving a hash value of a file and requesting devices to search and respond with information about files that have the same hash value. Furthermore, based on the table of hash values for all the files, the system can recreate the origination of each file and the number of different versions that exist of the file.

20 Claims, 6 Drawing Sheets

SENSITIVE DATA MANAGEMENT

TECHNICAL FIELD

The present disclosure relates to managing data files, and more specifically, to controlling the distribution, copying, and versions of data files.

BACKGROUND

A major problem with storing confidential information in a digital format is that ifs hard to track and ensure that the information stays confidential. Users can easily copy and share digital media through emails, shared folders, and/or the like, which bypasses all of the permissions bounderies defined on the specific location the file was first saved. Therefore, it would be advantageous to have a mechanism that could monitor and manage the distribution of digital media.

The detailed description that follows provides several embodiments and advantages of the system of the present disclosure. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. However, persons skilled in the art would recognize that they may practice some embodiments without some or all of these specific details. The particular embodiments disclosed herein are meant to be illustrative but not limiting. One skilled in the art may realize other elements that, although not specifically described here, are within the scope and the spirit of this disclosure. Also, to avoid unnecessary repetition, one or more features shown and described in association with one embodiment may be incorporated into other embodiments unless expressly described otherwise or if the one or more features would make an embodiment non-functional.

Some embodiments of the present disclosure provide a way of detecting the spread of a data file. In some examples, the system adds a hash table in the leftover cluster space of the memory cluster holding the file. The hash table may contain a hash of the original file and hashes of the file whenever the file has any changes. In this manner, the system can track the number of changes that the file has gone through and also quickly identify copies of the files or child files that spawned from the original file. In some examples, the system may include client devices and one or more central devices, such as a server. The client devices may be configured to add hash tables to files for tracking. The server may request hash tables from client devices to determine which client devices have a particular file. The server may provide a hash from a hash table for client devices to search for, and the client devices may be configured to respond by searching for files with matching hashes in hash tables and providing the file and/or hash tables with matching hashes to the server. The server may identify responding devices from which the server receives the files and/or hash tables. The server may use the hash tables to determine the different versions, and map which client devices have each file version.

The server may also communicate with the devices and be able to replace, edit, and/or delete files. In some examples, the system, in response to a request from a client device, may conduct a version update on client devices such that the client devices are left with a particular version of a file. In some examples, the system may delete files off of or encrypt files on one or more client devices in response to a request. In some cases, the system may edit a file. The system may also maintain a database of deleted files for future recovery and/or forensics auditing.

Figure 1:
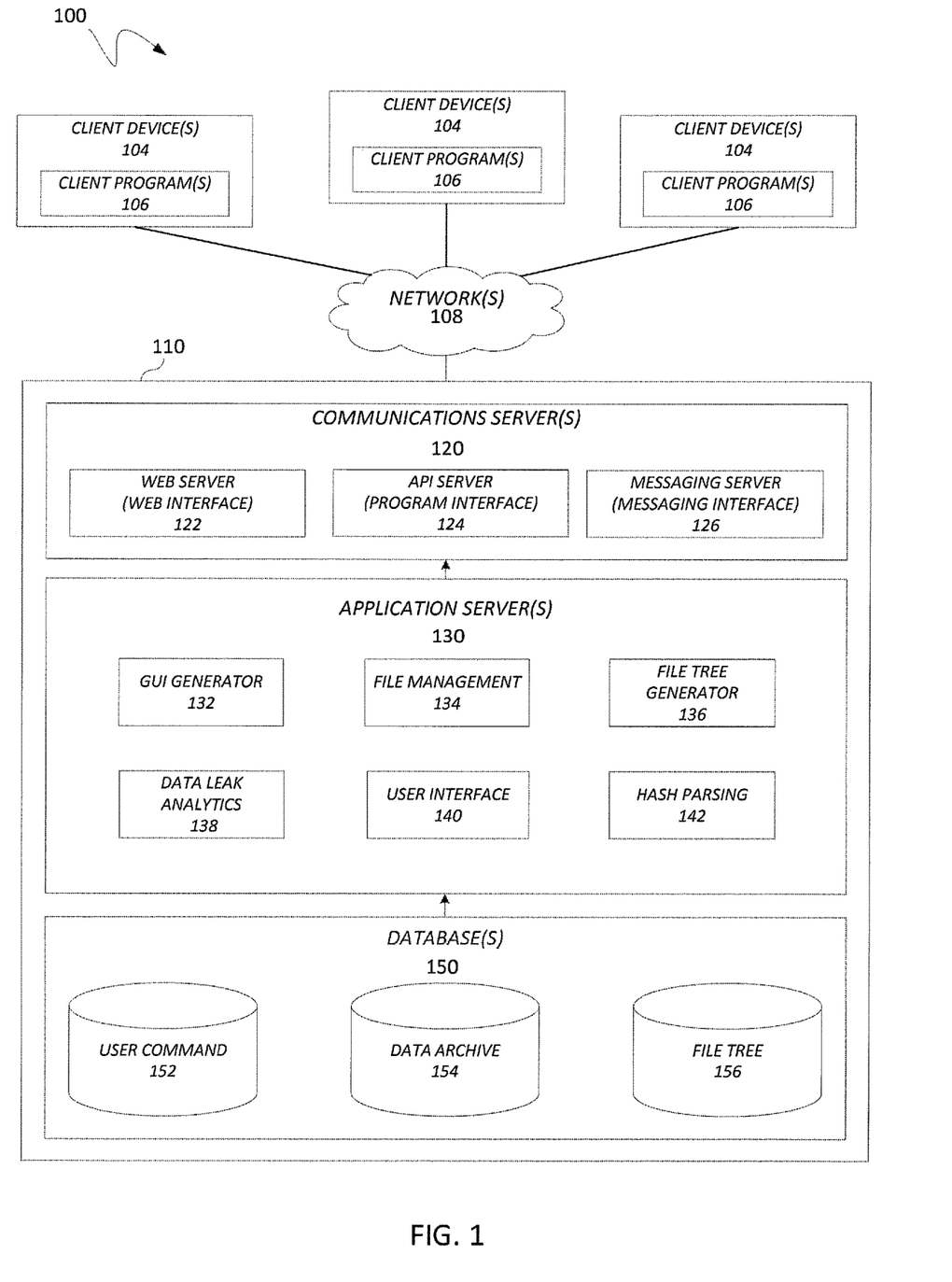
FIG. 1 is a block diagram of an example computing system for data file management.

FIG. 1 illustrates, in block diagram format, an example embodiment of a computing system adapted for implementing one or more embodiments disclosed herein for data file management. As shown, a computing system 100 may comprise or implement a plurality of servers, devices, and/or software components that operate to perform various methodologies in accordance with the described embodiments. Example servers, devices, and/or software components may include, for example, devices operating an operating system (OS) such as a MICROSOFT® OS, a UNIX® OS, a LINUX® OS, or other suitable OS. It may be appreciated that the system illustrated in FIG. 1 may be deployed in other ways and that the operations performed and/or the services provided by such systems may be combined, distributed, and/or separated for a given implementation and may be performed by a greater number or fewer number of devices. One or more devices may be operated and/or maintained by the same or different entities.

Computing system 100 may include, among various devices, servers, databases and other elements, one or more clients that may comprise or employ one or more client devices 104, such as a laptop, a mobile computing device, a tablet, a PC, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below. For example, one of the applications may be an agent that monitors files and attaches hash tables to one or more files, as discussed below.

As shown, client devices 104 may communicatively couple via one or more networks 108 to a network-based system 110. Network-based system 110 may be structured, arranged, and/or configured to communicate with various computing devices 104 and/or client programs 106. Accordingly, a communications session between client devices 104 and network-based system 110 may involve unidirectional and/or bidirectional exchange of information and may occur over one or more types of networks 108 depending on the mode of communication. While the embodiment of FIG. 1 illustrates a computing system 100 deployed in a client-server operating environment, it is to be understood that it is possible to use other suitable operating environments and/or architectures in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN. In some examples, client devices 104 may communicate with network-based system 110 by sending and or receiving information via one or more communication protocols such as HTTP/S, TCP, UDP, and/or the like. In some examples, communications may be through interaction with a website, e-mail, IM session, VPN, and/or the like. Any of a wide variety of suitable communication types between client devices 104 and system 110 may take place, as will be readily appreciated. In some examples, wireless communications of any suitable form may take place between client devices 104 and system 110.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by clients to the various services and functions provided by application servers 130.

Application servers 130 of network-based system 110 may be a server that provides various services to client devices, such as file and data leak management. Application servers 130 may include multiple servers and/or components. For example, application servers 130 may include a GUI generator 132, file management ending 134, file tree generator 136, data leak analytics engine 138, user interface engine 140, and/or hash parsing engine 142. These servers and/or components, which may be in addition to other servers, may be structured and arranged to help manage files and data leaks.

Application servers 130, in turn, may be coupled to and capable of accessing one or more databases 150 including a user command database 152, data archive database 154, and/or file tree database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
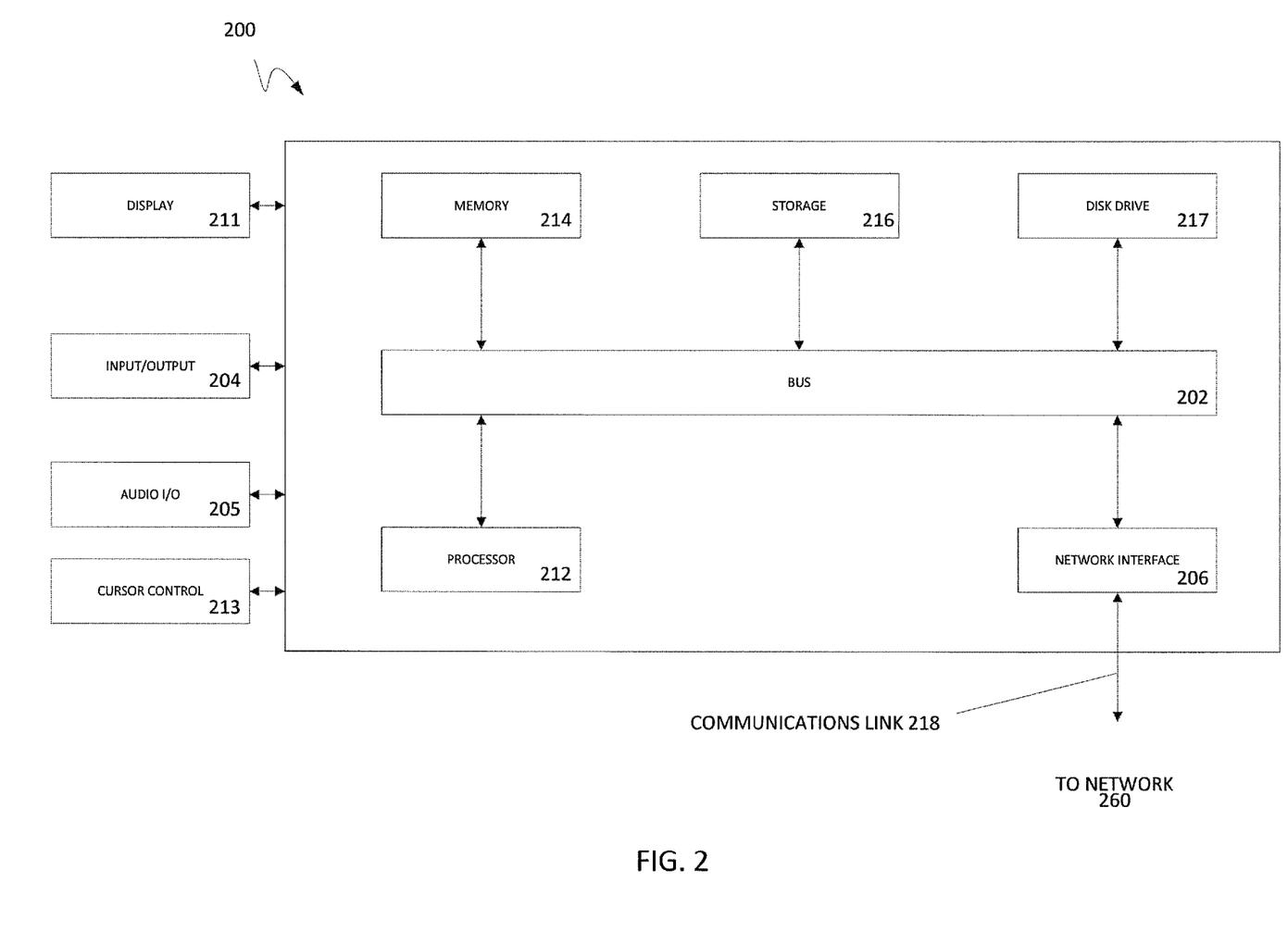
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider may utilize a network computing device (e.g., a network server) capable of communicating with the network. It should be appreciated that each of the devices utilized by users and service providers may be implemented as computer system 200 in a manner as follows.

Additionally, as more and more devices become communication capable, such as new smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal-oxide-semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or another processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer-readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. Also, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client devices 104, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
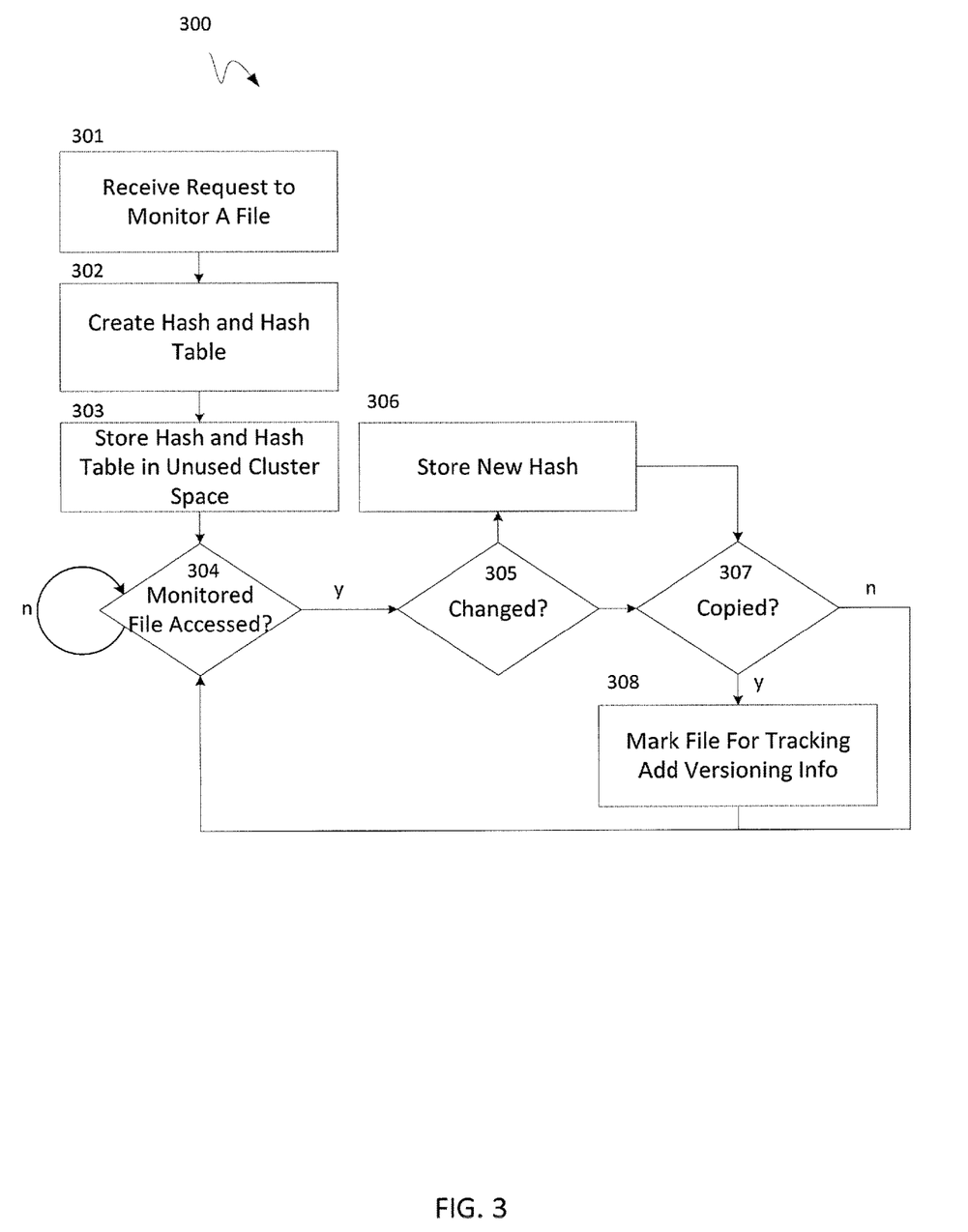
FIG. 3 is a flow diagram illustrating an example file modification process for tracking data files.

FIG. 3 illustrates an example process 300 for modifying files for tracking and management that may be implemented by a system, such as system 100 of FIG. 1. Process 300 may include operation 301. At operation 301, the system may receive a request to monitor a data file. In some examples, the system may receive the request from a user on a user device, such as one or more of client devices 104 of FIG. 1. The request may be initiated by a user of the user device. In some examples, in response to receiving the request to monitor a data file, the system may mark the file, which may provide an indication to the system and/or an application, such as one or more of client programs 106 of FIG. 1, that the file is being monitored. In some examples, the system may create a ledger or log of files being monitored. The log may include the location of the file, name of the file, and/or other information that identifies the file. In some examples, the system may append data to the data file to indicate that it is being monitored, such as a bit value appended to the data file. In some examples, the indication that a file is being monitored may be a hash table and/or hash number of the data file appended to the data file.

In some examples, the system, at operation 302, may determine a hash of the data file and store it in a table for hash numbers at operation 303. In some examples, the hash number and table for hash numbers may be appended to the data file. As discussed above, a system and/or application may use the existence of the table for hash numbers, and/or hash number appended to the data file as an indicator to monitor any actions with the data file.

An example table for hash numbers may be the following:

Hash #1
Hash #2
Hash #3
. . .
Hash #n

In the above example, Hash #1 may be a hash of an original file. Hash #1 may correspond to an unmodified state of the original file (e.g., the original file as unmodified since its creation) and/or to a state of the original file when the original file was marked for monitoring. Hash #1 may be a value created by hashing the original data file or part of the original data file. Hash #1 may be archived and stored in the table for hash numbers as a record that remains even if changes are date to the file or if a copy and/or another instance is made. The system may use Hash #1 for tracking copies or child data files because, as detailed below, new files that trace back to the original file may also maintain Hash #1 and the table for hash numbers (or a copy of the table for hash numbers).

Hash #2 may be an entry associated with an edit made to the original file. For example, a user may edit the original file and save a corresponding edited file. In some implementations, saving the edited file may overwrite the original file. Further, an agent or application executed by the system may recognize that the original file has been edited and store a new hash value associated with the edited file in the table for hash numbers. In some examples, the system may determine that a particular file has been edited by determining a hash value of the particular file and comparing it to the last hash value (e.g., the most recent hash value) stored in the table for hash numbers. If the hash value of the particular file is equal to the last hash value, the system may determine that no edits were made to the particular file. On the other hand, if the hash value of the particular file is not equal to the last has value, the system may determine that the particular file has been edited.

In some examples, the system may use hashes to indicate that a data file is a copy of another data file. The hash allows for a system to ensure that the file is a true copy which is advantageous over checking the file name or other meta data, which only indicates a file is a copy. For example, Hash #2 may correspond to a first data file, and Hash #3 may correspond to a second data file. Further, Hash #3 may be the same as Hash #2, which may indicate that the second data file is a copy of the first data file rather than an edit of the first data file. By having the hash values in this manner, the system may be capable of identifying specific file duplicates for removal or "de-duplicate" files. Hash #3 may be the same as Hash #2, thus indicating that the file is a copy of the file with Hash #2 and not an edit. The advantage of conducting the table for hash numbers in this manner is that there does not need to be an additional data field for tracking when the file is copied. Additionally, hashes are file agnostic and can support any file format including documents, images, videos, and/or the like. However, in some embodiments, a separate data field may track whether the file has been copied and/or edited. Additionally, there may be additional data fields to add other information, such as timestamps, tags indicating the content (e.g. whether it has personally indefinable information), device or user identification associated with the copy and/or edit, the application and/or operating system that edited or copied the file, process identifier, directory path information about the file and/or associated applications, and/or the like.

In some examples, the table for hash numbers may be created with empty fields for entries. In some embodiments, the table for hash numbers may add fields as needed. In some examples, the table for hash numbers may use the slack space or remaining space on a cluster that is containing the file or parts of the file. Generally, file systems support a limited number of clusters so as to reduce the overhead of managing data on a memory device. For example, the FAT file system uses a file allocation table and NTFS uses MFT (Master File Table). The file allocation table contains entries for each cluster of memory or disk space and has a limited number of entries. The size of the cluster in some examples can be manually set. The size of a cluster depends on the physical characteristics of the disk, size of the disk or partition, and the maximum number of clusters supported by the file system. Because file systems use clusters, data files take up memory space in whole cluster numbers. As such, the size of a file may not correspond to a whole number multiple of a cluster. Because of this, unused memory space may exist from storing the file. For example, if a data file has a size of 1 KB and a cluster is 4 KB, the data file will still effectively occupy 4 KB because that is the minimum cluster size. The slack or remaining cluster space would then be the 3 KB that are not being used to hold the data file (which may also contain data from a previously saved file on that cluster). Instead of wasting that space, the system can maintain the hash value and/or table for hash numbers for a data file in that remaining unused space corresponding to the data file.

Another benefit of using the slack space is that it is generally invisible and treated differently than the file held in the data stream. In some cases, the information is held in the slack space without any indication of its existence. In some cases, depending on how the system is configured to handle slack space, the information held in the slack space may be treated as a separate file attached to the data file occupying the cluster. As such, the information held in the slack space corresponding to a data file is ignored by the operating system when accessing the data file, and a hash of the data file would not be affected by the information held in the slack space.

In some examples, process 300 may include operation 304. At operation 304 the system may determine whether a file that is being monitored, as requested in operation 301, is accessed or used by a user. In some examples, an agent or application may be on the client device with the data file, and the agent may intercept file access requests from a user. In response to intercepting a file access request, the agent may check to determine whether the file is a filed requested to be monitored from operation 301. In some examples, the system may determine whether a file is being monitored by checking whether it has a hash table, hash number, or other information indicated that the user requested the system to monitor the file.

If the user did not request the system to monitor the file, the system might continue to monitor user actions with data files. If the file is a monitored file and the user accessed the data file, the system may continue to operation 305. In some examples, the system may be configured to automatically monitor certain files based on certain characteristics. For examples, the system may be configured to scan a file for personal identifiable information, and based on determining that personal identifiable information exists in the file, the system may automatically monitor the file. Furthermore, personal identifiable information may be subject to certain restrictions, and the system may also be configured to remove a file from a device based on permissions.

At operation 305, the system may determine whether the user or user device changed or edited the monitored file. In some examples, the system may conduct a hash of the file to determine if the hash value changed from the last value in the table of hashes associated with the file. A change in hash values would indicate that the file was edited, modified, or changed in some way. If the hashes match one or more of the hash values in the table of hashes associated with the file, the system can determine that the file was not changed.

In some examples, if the system determines at operation 305 that the file has changed, the system may continue to operation 306. At operation 306 the system may compute and store a new hash value for the file in the hash table created in operation 302. In some examples, the system may expand the hash table and then add the new hash value to the hash table.

In some examples, process 300 may include operation 307. At operation 307 the system may determine whether the device made a copy of the data file. In some examples, operation 307 may occur before or simultaneously with operations 305 and/or 306. In some examples, operation 307 may occur after operations 305 and/or 306.

In some examples, to determine whether a copy of a file was made, the system may monitor for whether a user requests that the system or device make a duplicate of the monitored file. If the file was not copied and/or changed, the system may continue to operation 304, and the system may continue to monitor files.

If a copy of a monitored file is requested, the system may mark the copied file for monitoring. In some examples, the system may attach the hash table and hash values from the monitored file to the copy of the monitored file, which may include various metadata (timestamp, tags representing the content and/or the like). In this manner, the system can continue to track the duplicated file as well as the monitored file. In some examples, to indicate that the file is a copy, the system may provide an indicator that the file is a copy. In some examples, the system may add a duplicate hash of the last hash of the monitored file. Duplicating the hash value, as discussed above, may allow the system to determine that the file is a copy. Once operation 308 is completed, the system may continue to operation 304 to continue monitoring the monitored files, including the copied file at operation 307.

In some examples, the system may maintain a central database of file copies, which may be updated based on messages sent by an agent on a client device whenever a copy of a file is made.

Figure 4:
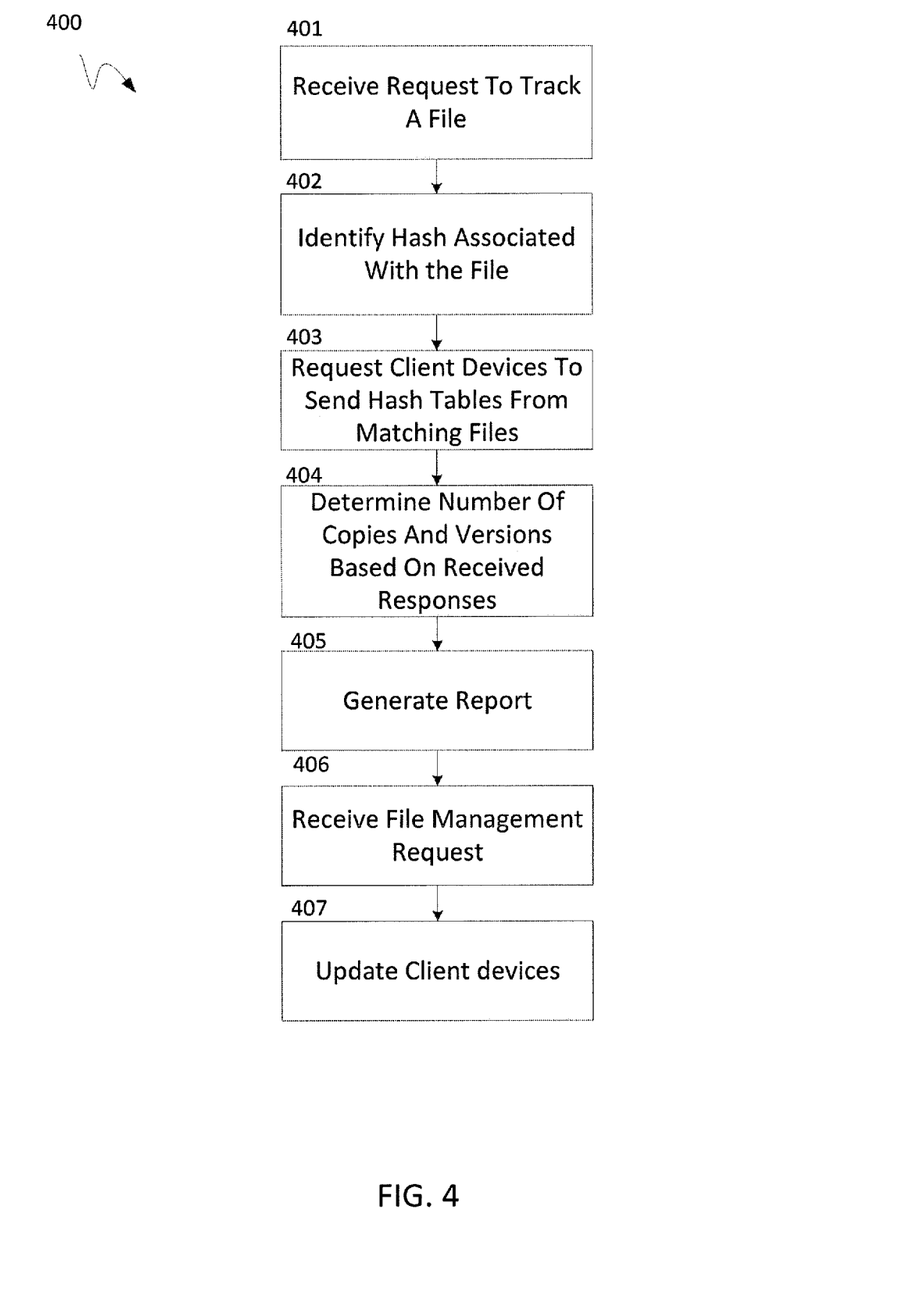
FIG. 4 is a flow diagram illustrating an example process for managing data files.

FIG. 4 illustrates an example process 400 for managing files, such as the marked files discussed above with process 300 of FIG. 3. In some examples, process 400 that may be implemented by one or more devices of a system, such as system 100 of FIG. 1.

In some examples, process 400 may include operation 401. At operation 401, the system may receive a request to track a data file. The data file may be an image, text document, video file, or any other data file. In some examples, the system may receive a copy of the file associated with the request, or the copy of the file may serve as the request. In some examples, the system may receive a hash value and/or hash table associated with the requested file. In some examples, the hash value and/or hash table may serve as the request to track the file.

At operation 402, the system may identify a hash value associated with the file. In some examples, as discussed above, this hash value may be provided by the client device making the request. In some examples, the system may identify the hash value from a table of hash values that the device provides with the request at operation 401. In some examples, the table of hash values may have multiple hash values and the system may determine the first hash value, which may correspond to the hash value of the original, unedited file from the table of hash values.

In some examples, process 400 may include operation 403. At operation 403 the system may request one or more client devices to search for files that have or maintain matching hash values. The system may request the client devices to send a copy of the file with the matching hash value, information about the file, a copy of the table of hash values associated with the files, and/or the like. In this manner, the system may be able to conduct hash comparisons and determine which client devices have a copy of the file. In some examples, the system may request the devices to conduct the hash comparison and provide results.

In some examples, process 400 maybe include operation 404. At operation 404 the system may determine the number of copies of the tracked file exist, the different versions and/or other information about the tracked file based on the responses received at operation 403.

At operation 405, the system may generate a report to respond to the request received at operation 401. In some examples, the system may generate a graphical visualization of the tracked file indicating where the files are located, which files are copies and/or have edits, the version of the files, and how the files originated. In some examples, the graphical visualization may be a family tree for the tracked file, such as the example file family tree discussed in more detail below. In some examples, the system may generate a GUI for display on a device of the system for interaction. When a user selects a file, the system may provide one or more options or commands for managing the files displayed in the GUI or the generated report.

In some examples, the report may provide additional information or statistics regarding data leak. For example, the table of hash values may also keep track of when a file was copied. The system may conduct a regression analysis to determine how quickly the number of copies is increasing. The system, as part of the report, may provide the speed at which files are being copied and a value associated with the acceleration of the pace at which files are being copied. The system may provide a projection graph predicting the number of copies that will occur over a given future time.

In some examples, the system may also provide information as to the culprits that are causing the data leaks. For example, the system may identify the client devices that are making the most copies of the data file. In this manner, a user may be able to identify the devices that are responsible for the largest sources of data leaks and prevent those devices from having access to the file.

In some examples, the system may receive a request at operation 406 from one or more devices to manage files. In some examples, the system may conduct an authentication, check credentials, or otherwise determine whether the request is coming from an authorized user. In some examples, the system may request a username and password or other authentication information. If the request has proper authority the system may continue to operation 407 and update devices based on the command.

At operation 407, the system may determine and perform the command received at operation 406. Some exemplary commands that the system may have received include, but are not limited to, deleting a file off of one or more client devices, replacing files of one or more devices, homogenizing versions of files on client devices, changing files to match a particular version and providing an indication of the changes (such as track changes), and/or the like.

For example, if the command was to remove a file from one or more client devices, the system may instruct those devices to delete the data files and/or actively conduct the deletion or encryption of those files off the client devices. Encryption allows for the access to the file be restricted until a user contacts an administrator to resolve whether the user has the correct permissions. Similarly, the request may be to change the version of a file to match another version. For such a request, the system may obtain a copy of the data file version to use for updating and replace the files on client devices that do not have the correct version. In some examples, a copy of the data file may be provided to the system by the requesting client device. In some examples, the system may retrieve the data file from one or more client devices that have a copy of the data file in the same version or state. The version or state of each file may be determined based on the report generated in operation 405.

In some examples, when the system updates a data file, the system may leave an indication that an update occurred. In some examples, the system may change the file name to indicate the change. The indication may include a time of change and/or an identifier or which device or who requested the change. In some examples, instead of replacing a file to the correct version, the system may compare the contents of the file and conduct edits while also tracking changes. For example, the system may use track changes in Microsoft Word® and/or other similar change tracking mechanisms. In this manner, a user may be able to determine the differences in the different version.

In some examples, when a particular action is performed, the system may remember the action and instruct the device to maintain the same state as the completed command. For example, a user may request that the data file be deleted from a client device, but also to maintain that state. In such an example, the system may instruct the device to ensure that another copy of the file is not kept on the client device or the system may ensure that the device does not maintain a copy of the data file. The system and/or client device may scan for the data file and delete it automatically if it appears on the client device again. In some examples, the system may shred the file to prevent the system from restoring the file. In some examples, instead of deleting the file, the system may encrypt the file, which leaves the file but may require a password or permission to access the contents.

In some examples the system may maintain an archive of different versions of files that get deleted for reversion. In this manner, a user may unify versions, but also be able to restore old versions.

Figure 5:
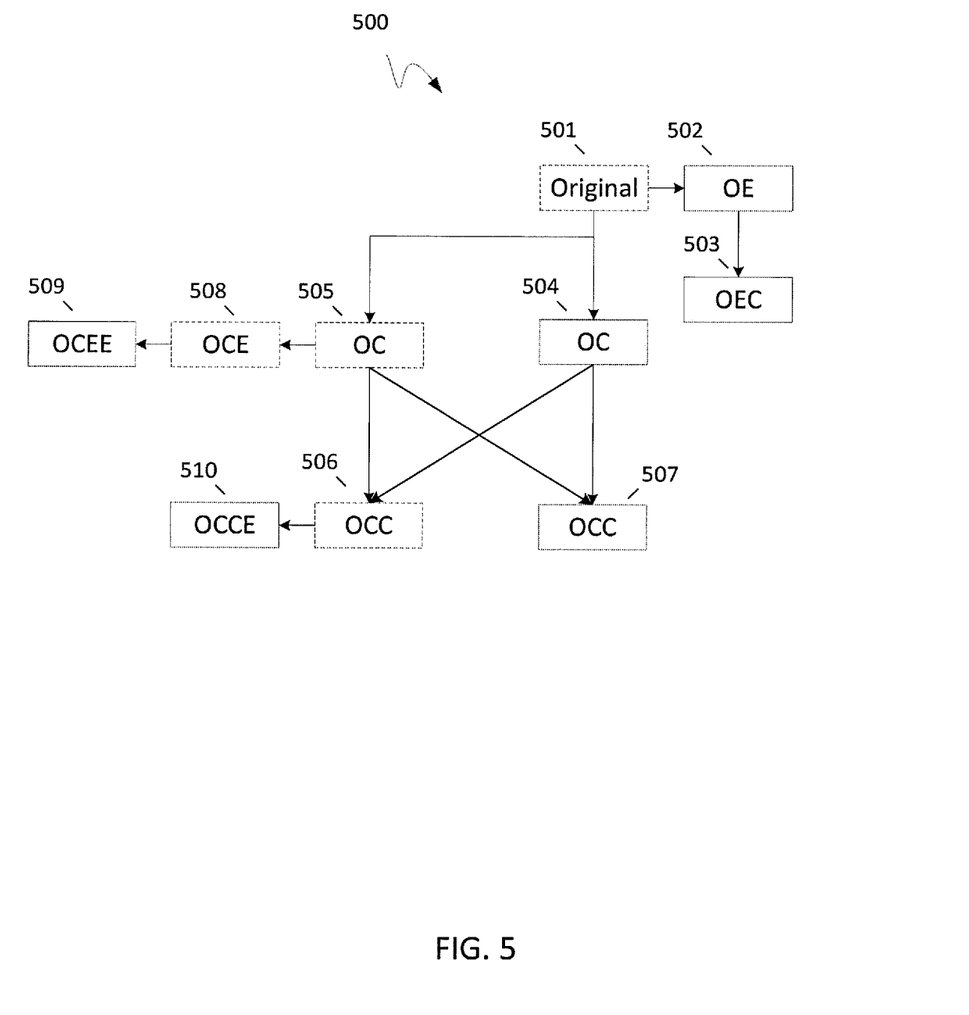
FIG. 5 illustrates an example data file tree for viewing and/or as part of a graphical user interface.

FIG. 5 illustrates an example visual, data-file tree 500 as discussed in operation 405 in FIG. 4. As shown, at the top of the tree 501 indicates the original file. In some examples, the original file may be determined once the system begins monitoring the file. The original file may have a hash associated with it in a table of hash numbers as discussed above. As indicated by 502, the original file was edited. The image of reference 502 is at the same level and horizontal to the original file 501 indicating that they are the same file, but edited. Additionally, as shown in the image of reference 502, the code OE is shown. The code may be in the order of the hashes each letter represents in the table of hash values associated with the file. Here 0 would stand for the original hash and E stands for the second hash which the system determines is an edit to the file because there is a new additional hash different from the original hash in the table of hash values.

Additionally, as shown by element 503, a copy was made of the edited, original file. The system would have determined this when it received a file or hash table from a client device with the same hash values in the same order as the file associated with element 502 in addition to an indication that the file is a copy. As discussed above, in some examples an indication of a copy may be a duplicated hash value. However, other indications that a file has been copied may also be used.

Similarly, elements 504 and 505 indicate that those are copies of the original file, which the system may determine by investigating the table of hash values for those files. The table of hash values for the files associated with element 504 and 505 would not have the hash value of the edited file associated with element 502 at the right place. Furthermore, as indicated by element 506 and 507, a copy of the files associated with 505 and 504 was made. In this particular graphic, arrows are shown from element 505 and 504 to both element 506 and 507 as the system may not be able to determine the originating file for creating the copies represented by element 506 and 507. In some examples, the system may keep track of each copy in a separate data field or as part of the hash value to indicate which copy occurred first. In this manner, the system would be able to track exactly which file a copy was made from when there are multiple possible originating files.

Additionally, as indicated by element 508 and element 509, the copied file represented by element 505 has been edited twice. Also, as shown by element 510, the copied file represented by element 506 has been edited as well.

In some examples, the data-file tree 500 may include indicators to indicate how many files there are and which references are associated with previous versions of a file. For example, a dashed line is shown around elements 501, 505, 506, and 508 indicating that those are not files on a computer, but represent the historical states of the files. Elements 502, 503, 504, 507, 509, and 510 are actual files in current states held on one or more devices.

Figure 6:
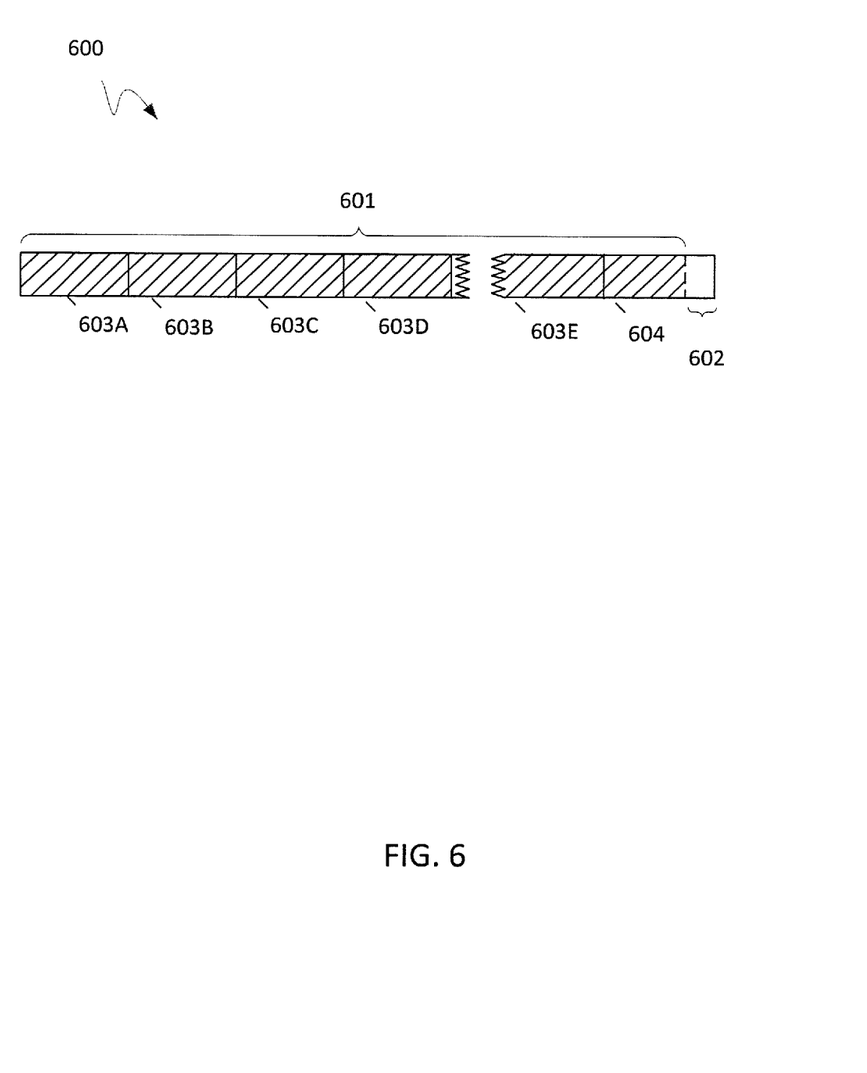
FIG. 6 illustrates an example block diagram of data clusters with a data file stored on the data clusters and slack space for storing additional information.

FIG. 6 is an example illustration of memory 600 held on memory with the remaining cluster space being used for holding a historical table of hash values associated with the file 600 with remaining slack space 602. As shown file data 601 is held in several clusters including 603A-E as indicated by the diagonal lines. Furthermore, file data 601 occupies a portion of cluster 604, as indicated by the diagonal lines. In such an example, the amount of space held on disk by data file 601 would include slack space 602. As such, slack space 602 would be wasted. However, as discussed above with respect to process 300 and 400 of FIGS. 3 and 4 respectively, a system can use that space to hold hash information and a table of hash values associated with the file. In this manner, the system would be able to manage and track files by taking advantage of the unused slack space rather than on a new cluster.

The preceding disclosure is not intended to limit the present disclosure to the precise forms or particular fields of use disclosed. As such, it is contemplated that various alternate embodiments and/or modifications of the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a server configured to:
receive a request to manage instances of a first file;
determine a first hash value associated with the first file in response to the request to manage the instances of the first file;
send a request to a second device to identify files that have hash values that match the first hash value and to provide, in response to the request to the second device, information regarding the files that are identified as having a hash value that matches the first hash value, wherein the request to the second device comprises the first hash value from a first hash table, wherein the first hash table is stored in a remaining unused space of a cluster of memory allocated for the first file, the first hash table stores the hash values that have been generated for the first file over time, and wherein any information stored in the remaining unused space is not used by an operating system when calculating the hash values stored in the first hash table;
receive a response to the request to the second device;
determine, based on the response to the request to the second device, that a second file managed by the second device corresponds to the hash values that match the first hash value,
receive a request to edit instances of the first file; and
request the second device to edit the second file based on the request to edit instances of the first file; and
the second device comprising:
a non-transitory memory storing instructions; and
one or more hardware processors coupled to the non-transitory memory and configured to read the instructions from the non-transitory memory to cause the second device to perform operations comprising:
receiving the second file, the second file being a copy of the first file and having the first hash value in a second hash table;
adding a second hash value to the second hash table in response to a user edit to the second file, wherein the second hash value represents content of the second file that includes the user edit, and maintaining the first hash value with the second file, wherein the second file is associated with the first hash value and the second hash value, wherein the first hash value represents content of the second file prior to the user edit;
receiving, from the server, the request to the second device to provide information regarding files that have hash values that match the first hash value;
determining that the second file has the first hash value;
sending information associated with the second file to the server based on determining that the second file has the first hash value and the request to the second device; and
editing the second file in response to receiving the request to edit the second file from the server.

2. The system of claim 1, wherein editing the second file comprises deleting the second file.

3. The system of claim 1, wherein editing the second file comprises replacing the second file with a copy of the first file.

4. The system of claim 1, wherein the server is further configured to create a version map for the second file.

5. The system of claim 1, wherein the request to edit the second file is a general request to edit files not matching the first file.

6. The system of claim 5, wherein editing the second file is also in response to determining that the second hash value associated with the second file does not match the first hash value associated with the first file.

7. The system of claim 1, wherein the information stored in the remaining unused space is stored without any indication that the information is stored in the remaining unused space.

8. A non-transitory machine readable medium having stored thereon machine readable instructions executable to cause a machine to perform operations comprising:
determining a first unique hash value for a first file;
requesting at least one device to search for files that have a hash table with the first unique hash value and to provide any hash table with the first unique hash value in response to the request, wherein the request comprises the first unique hash value from a first hash table, wherein the first hash table is stored in a remaining unused space on a cluster of memory for the files and the hash table stores hash values that have been generated for the first file over time, and wherein any information stored in the remaining unused space is not used by an operating system when calculating the hash values stored in the first hash table;
receiving at least one hash table in response to the requesting, wherein the at least one hash table includes a second hash table that includes the first unique hash value and a second unique hash value that was added to the second hash table in response to a user edit to a second file associated with the second hash table such that the second unique hash value represents content of the second file that includes the user edit, and wherein the first unique hash value represents content of the second file prior to the user edit;
receiving a request to edit the second file associated with the second hash table; and
editing the second file on the at least one device in response to receiving the request to edit the second file.

9. The non-transitory machine readable medium of claim 8, wherein editing the second file on the at least one device comprises deleting the second file.

10. The non-transitory machine readable medium of claim 8, wherein editing the second file on the at least one device comprises replacing the second file with a copy of the first file.

11. The non-transitory machine readable medium of claim 8, wherein the operations further comprise creating a version map for files on a plurality of devices based on the at least one hash table received.

12. The non-transitory machine readable medium of claim 8, wherein the request to edit the second file is a request to edit files not matching the first file.

13. The non-transitory machine readable medium of claim 12, wherein editing the second file is also in response to determining that the second unique hash value associated with the second file does not match a current hash value associated with the first file.

14. The non-transitory machine readable medium of claim 8, wherein the information stored in the remaining unused space is stored without any indication that the information is stored in the remaining unused space.

15. A computer implemented method comprising:
  determining a first unique hash value and second unique hash value for a file;
  requesting at least one device to search for files that have a hash table with the first unique hash value and to provide any hash table with the first unique hash value in response to the requesting, wherein the requesting comprises the first unique hash value from a first hash table, wherein the first hash table is stored in a remaining unused space on a cluster of memory allocated for the file and the hash table stores hash values that have been generated for the file over time, and wherein any information stored in the remaining unused space is not used by an operating system when calculating the hash values stored in the first hash table;
  receiving at least one hash table in response to the requesting from the at least one device, wherein the at least one hash table includes a second hash table that includes the first unique hash value and a third unique hash value that was added to the second hash table in response to a user edit to a second file associated with the second hash table such that the third unique hash value represents content of the second file that includes the user edit, and wherein the first unique hash value represents content of the second file prior to the user edit;
  receiving a request to edit files without the second unique hash value;
  determining that the second hash table does not have the second unique hash value; and
  editing the second file associated with the second hash table in response to receiving the request to edit files without the second unique hash value.

16. The computer implemented method of claim 15, wherein editing the second file on the at least one device comprises deleting the second file.

17. The computer implemented method of claim 16, further comprising creating a version map for files on a plurality of devices based on the at least one hash table received.

18. The computer implemented method of claim 15, wherein the editing the second file comprises replacing the second file with a copy of the file.

19. The computer implemented method of claim 15, further comprising restoring the second file in response to a user request.

20. The computer implemented method of claim 15, wherein the information stored in the remaining unused space is stored without any indication that the information is stored in the remaining unused space.

* * * * *